(12) United States Patent
Caraway

(10) Patent No.: US 11,397,105 B2
(45) Date of Patent: Jul. 26, 2022

(54) MODULAR WIRELESS SCALE SYSTEM COMPRISING MICROSCALES

(71) Applicant: Michael Caraway, Owens Cross Roads, AL (US)

(72) Inventor: Michael Caraway, Owens Cross Roads, AL (US)

( * ) Notice: Subject to any disclaimer, the term of this patent is extended or adjusted under 35 U.S.C. 154(b) by 155 days.

(21) Appl. No.: 16/166,319

(22) Filed: Oct. 22, 2018

(65) Prior Publication Data

US 2020/0124465 A1    Apr. 23, 2020

(51) Int. Cl.
*G01G 19/414* (2006.01)
*G01G 21/28* (2006.01)
*G01G 21/22* (2006.01)
*G01G 23/37* (2006.01)

(52) U.S. Cl.
CPC ....... *G01G 19/4144* (2013.01); *G01G 21/283* (2013.01); *G01G 23/3714* (2013.01); *G01G 23/3735* (2013.01); *G01G 21/22* (2013.01)

(58) Field of Classification Search
CPC .... G01G 19/4144; G01G 21/22; G01G 21/28; G01G 21/282; G01G 23/3714; G01G 23/3735
See application file for complete search history.

(56) References Cited

U.S. PATENT DOCUMENTS

| | | | | |
|---|---|---|---|---|
| 4,139,070 A | * | 2/1979 | Hanson | G01G 19/42 177/200 |
| 4,375,243 A | * | 3/1983 | Doll | G01G 3/142 177/25.17 |
| 4,632,198 A | * | 12/1986 | Uchimura | G01G 3/1412 177/211 |
| 4,711,314 A | * | 12/1987 | Suzuki | G01G 3/1412 177/164 |
| 4,778,016 A | * | 10/1988 | Uchimura | G01G 23/3707 177/164 |
| 4,804,052 A | | 2/1989 | Griffin | |
| 4,969,112 A | * | 11/1990 | Castle | G01G 19/025 177/136 |
| 5,190,117 A | * | 3/1993 | Freeman | G01G 3/1402 177/211 |
| 6,639,156 B2 | | 10/2003 | Luke et al. | |
| 8,263,881 B2 | * | 9/2012 | Oseko | G01G 19/44 177/25.13 |
| 8,969,743 B2 | * | 3/2015 | Huebler | G01G 21/23 177/25.15 |
| 2008/0264141 A1 | * | 10/2008 | Kenmochi | G01G 3/1414 73/1.08 |
| 2010/0181119 A1 | | 7/2010 | Saigh et al. | |

* cited by examiner

*Primary Examiner* — Randy W Gibson
(74) *Attorney, Agent, or Firm* — Greoge P Kobler

(57) ABSTRACT

A modular wireless scale system comprising microscales comprises a master scale that may be configured to be used with one or more slave scales. The master scale includes a heavy load cell and a light load cell disposed on opposite sides of a cuboid master housing. The master scale housing encloses a master computer-based microcontroller, a wireless transceiver, an accelerometer, and a power source, and may optionally include a display. The master scale may be used as a stand-alone scale for weights up to the maximum weight supported by the heavy load cell and the scale housing. Each of the slave scales includes a heavy load cell supported by a cuboid housing that encloses a slave computer-based microcontroller, a wireless transceiver, and a power source.

19 Claims, 6 Drawing Sheets

MODULAR WIRELESS SCALE SYSTEM COMPRISING MICROSCALES

BACKGROUND

Field

The present disclosure relates generally to scale systems for measuring weight, and in particular, to scale systems using multiple scales, and further to wirelessly communicating scale systems.

Description of the Problem and Related Art

Numerous manufacturing and warehousing businesses rely on weighing materials and products and rely on weight measurements to track incoming and outgoing inventory. Such business concerns use bulky large scales to weigh large loads. Weighing such materials entails moving the material to be weighed to the scale to obtain the measurement. This is a cumbersome evolution, and, in addition, a large scale takes up valuable space within the facility. Thus, there has been a need to provide a portable scale that can support large loads from tens of lbs to a ton or more.

One attempt to provide a portable scale that can handle large loads is disclosed in US Pub. App. No. 20100181119, by Saigh, et al., in which a case comprises four load cells connected to a controller for displaying the weight reading. The system includes a master load cell and three slave load cells all connecting to the controller by a series of cables. The cables are fed through a plurality of inertial winders in order to prevent the cables from becoming entangled with one another. It is apparent that this arrangement is still cumbersome because, while the scale system may be carried to the load, it must still be moved in the case. Further, because the components of the scale are connected with wires, there is the potential for mechanical failure thus decreasing the reliability of the system compared to a fully electronic solution.

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

A modular wireless scale system comprising microscales comprises a master scale and two or more slave scales. The master scale includes a heavy load cell and a light load cell disposed on opposite sides of a cuboid master housing. The master scale housing encloses a master computer-based microcontroller, a wireless transceiver, an accelerometer, and a power source, and may optionally include a display. Each of the slave scales includes a heavy load cell supported by a cuboid housing that encloses a slave computer-based microcontroller, a wireless transceiver, and a power source.

BRIEF DESCRIPTION OF THE DRAWINGS

The system is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
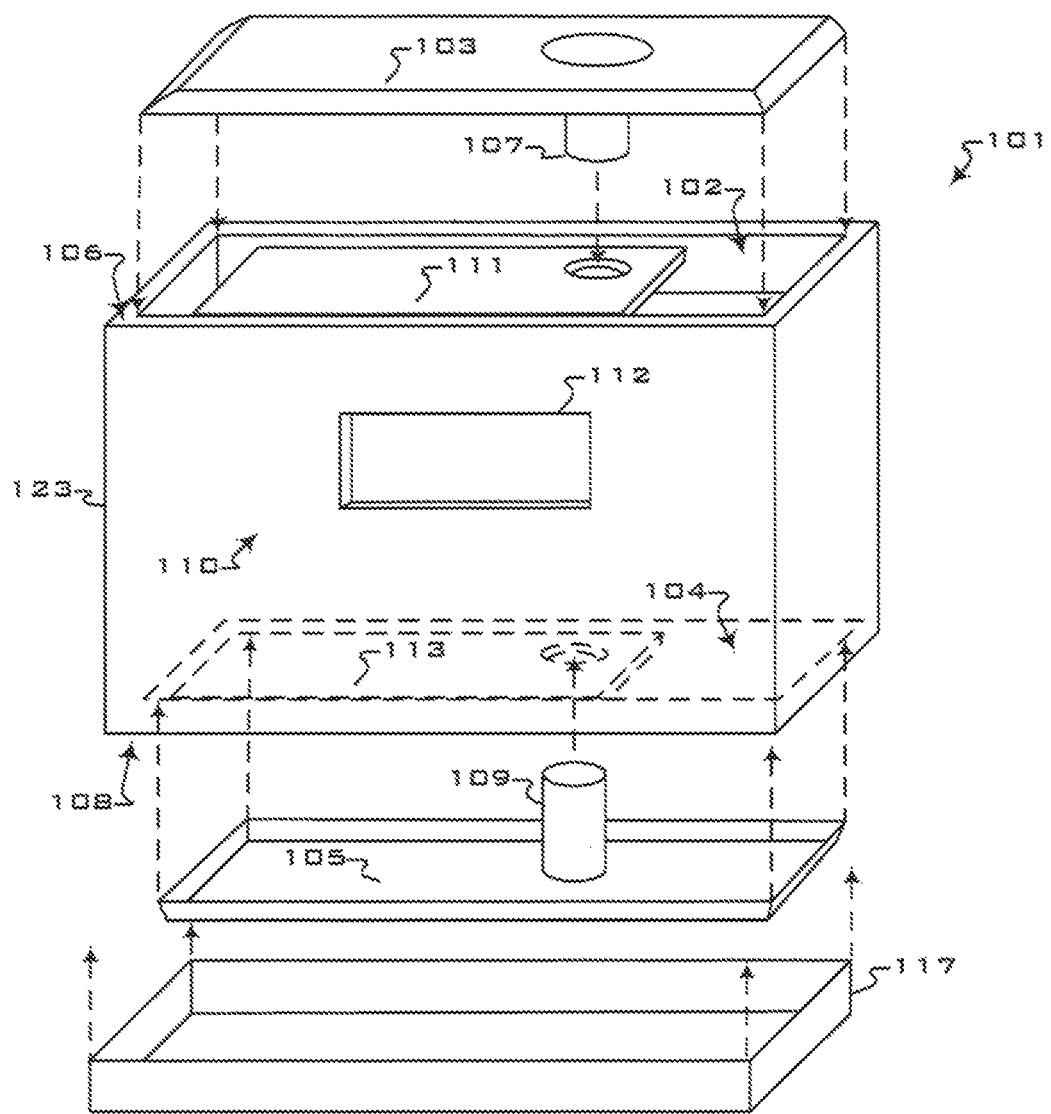
FIG. 1 is an exploded view of an exemplary master scale.

The various embodiments of the system and their advantages are best understood by referring to FIGS. 1 through 8 of the drawings. The elements of the drawings are not necessarily to scale, emphasis instead being placed upon clearly illustrating the novel features and principles of operation. Throughout the drawings, like numerals are used for like and corresponding parts of the various drawings.

Reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

References herein to a controller or microcontroller, as will be appreciated by those skilled in the arts, may be one or more computer-based processors. Such a processor may be implemented by a field programmable gated array (FPGA), application specific integrated chip (ASIC), programmable circuit board (PCB), or other suitable integrated chip (IC) device.

A processor in effect comprises a computer system. Such a computer system includes, for example, one or more central processing units (CPUs) that are connected to a communication bus. The computer system can also include a main memory, such as, without limitation, flash memory, read-only memory (ROM), or random access memory (RAM), and can also include a secondary memory. The secondary memory can include, for example, a hard disk drive or a removable storage drive. The removable storage drive reads from or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called control logic) are stored in the main memory or secondary memory. Computer programs can also be received via the communications interface. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system.

A processor, and the processor memory, may advantageously contain control logic or other substrate configuration representing data and instructions, which cause the processor to operate in a specific and predefined manner as, described hereinabove. The control logic may advantageously be implemented as one or more modules. The modules may advantageously be configured to reside on the processor memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like. Control logic may be installed on the memory using a computer interface couple to the communication bus which may be any suitable input/output device. The computer interface may also be configured to allow a user to vary the control logic, either according to pre-configured variations or customizably.

The control logic conventionally includes the manipulation of data bits by the processor and the maintenance of these bits within data structures resident in one or more of the memory storage devices. Such data structures impose a physical organization upon the collection of data bits stored within processor memory and represent specific electrical or magnetic elements. These symbolic representations are the means used by those skilled in the art to effectively convey teachings and discoveries to others skilled in the art.

The control logic is generally considered to be a sequence of processor-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for processor operations, and that these terms are merely conventional labels applied to physical quantities that exist within and during operation of the computer.

It should be understood that manipulations within the processor are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the processor or computers.

It should also be understood that the programs, modules, processes, methods, and the like, described herein are but an exemplary implementation and are not related, or limited, to any particular processor, apparatus, or processor language. Rather, various types of general purpose computing machines or devices may be used with programs constructed in accordance with the teachings described herein. Similarly, it may prove advantageous to construct a specialized apparatus to perform the method steps described herein by way of dedicated processor systems with hard-wired logic or programs stored in nonvolatile memory, such as, by way of example, read-only memory (ROM), for example, components such as ASICs, FPGAs, PCBs, microcontrollers, or multi-chip modules (MCMs). Implementation of the hardware state machine so as to perform the functions described herein will be apparent to persons skilled in the relevant art(s).

Figure 8:
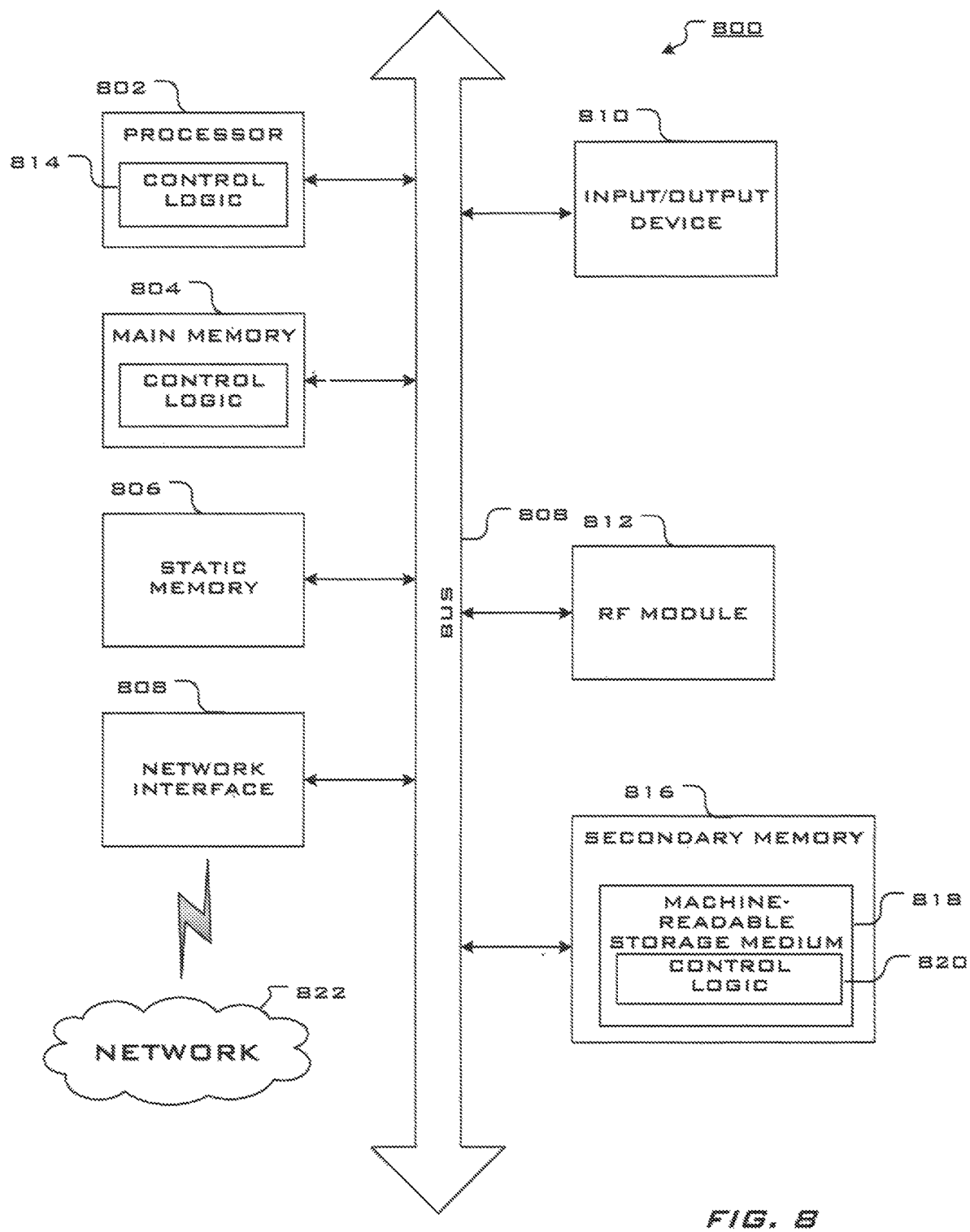
FIG. 8 is a functional diagram of an exemplary computing device.

An exemplary computing device 800 is functionally illustrated in FIG. 8, wherein the computer comprises one or more processors 802, a main memory 804 (e.g., read-only memory (ROM), flash memory, dynamic random access memory (DRAM) such as synchronous DRAM (SDRAM) or DRAM (RDRAM), etc., and may comprise a static memory 806 (e.g., flash memory, static random access memory (SRAM), etc.), and a secondary memory 816 (e.g., a data storage device), which communicate with each other via a bus 808.

Processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the control logic 814 for performing the operations discussed herein.

The computer system 800 may further include a network interface device 808 for allowing communication with any external networks. The computer system 800 preferably comprises an input/output device, for example a, display unit 910 which may be light emitting diode (LED), liquid crystal display (LCD), organic light emitting diode (OLED), or the like. Further, input/output device may also be a touch-sensitive screen.

The secondary memory 816 may include a machine-readable storage medium (or more specifically a computer-readable storage medium) 818 on which is stored one or more sets of instructions (e.g., control logic or software 820) embodying any one or more of the methodologies or functions described herein. The software 820 may also reside, completely or at least partially, within the main memory 804 and/or within the processing device 802 during execution thereof by the computer system 800, the main memory 804 and the processing device 802 also constituting machine-readable storage media. The software 820 may further be transmitted or received over a network 920 via the network interface device 808, or via wireless communications via a radio frequency (RF) communications module 812 which is configured to allow RF communications with devices having compatible communications protocols, e.g., IEEE protocol standards 802.11, 802.15, or the like.

FIG. 1 is an exploded diagram illustrating the components of an exemplary master scale 101. The master scale 101 is comprised of a cuboid housing 123 preferably formed from a solid metal or metal alloy material that is machined to form the internal support and mounting structures for the internal components housed within. On one side 106 thereof, the housing 101 supports a first load cell 111, herein referred to as the "heavy load cell." The heavy load cell 111 is seated within a recess 102 defined in the surface of the first side 106. A load plate 103 is attached to the heavy load cell 111 with a spacer 107. Similarly, on the opposing side 108 of the housing 123 a second recess 104 is defined in the surface thereof. A second, or light, load cell 113 is seated within the second opening 104 and a load plate 105 is attached to this load cell with a spacer 109. The housing 123 is also formed with an opening 112 defined in a perpendicular side 110 for an electronic display.

Figure 2:
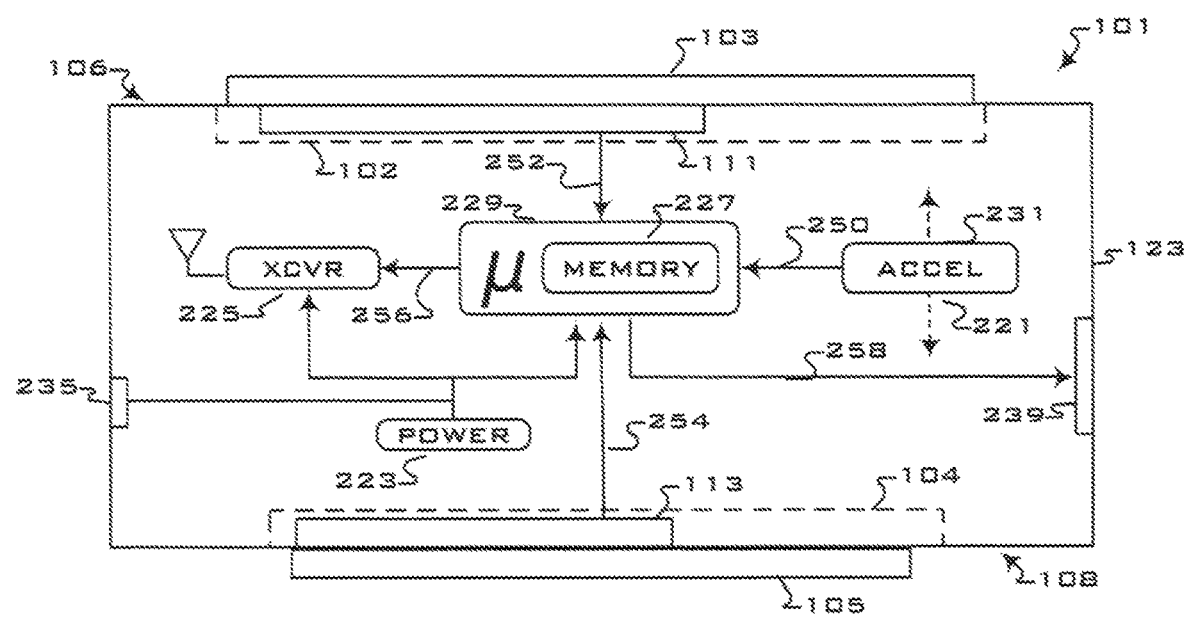
FIG. 2 is a functional diagram of the exemplary master scale of FIG. 1.

FIG. 2 presents a functional diagram of the internal components of the master scale 101. As shown, the heavy load cell 111 and the light load cell are in communication with a computer-based microcontroller device 229 enclosed within the housing 123 and which includes a computer-readable a memory 227. A power source 223 which may be a 9 volt battery, preferably rechargeable, supplies power to the microcontroller 207 and is selectively engaged with switch 217. Also enclosed in the housing 123 is a single-axis accelerometer 221 providing input to the microcontroller 229 and a radio frequency transceiver 225 responsive to the microcontroller 229. The axis 231 of the accelerometer 221 is oriented perpendicularly with respect to the orientation of the load cells 111, 113 such that when the master scale 101 is oriented with the heavy cell 111 upward, the accelerometer senses this and emits a signal to the microcontroller 229 which executes pre-programmed functions associated with use of the heavy load cell 111 as will be described below. Because of the weights measured when using the heavy load cell 111, supporting cap 117 (FIG. 1) is provided to cover the light load cell 113 and thereby protect it from damage.

In one embodiment, the heavy cell is rated to accommodate weights up to about 1000 lbs and can have a resolution down to about 1 lb. However, those skilled in the art will appreciate that load cells may be used that are capable of accommodating greater weight bearing in mind that the housing should also be adapted in size and possibly material composition to support such weights Also, in one embodiment, the light load cell may support up to 12 lbs with a resolution down to about 0.1 grams. However, the light load cell may be selected to accommodate heavier loads.

Figure 3:
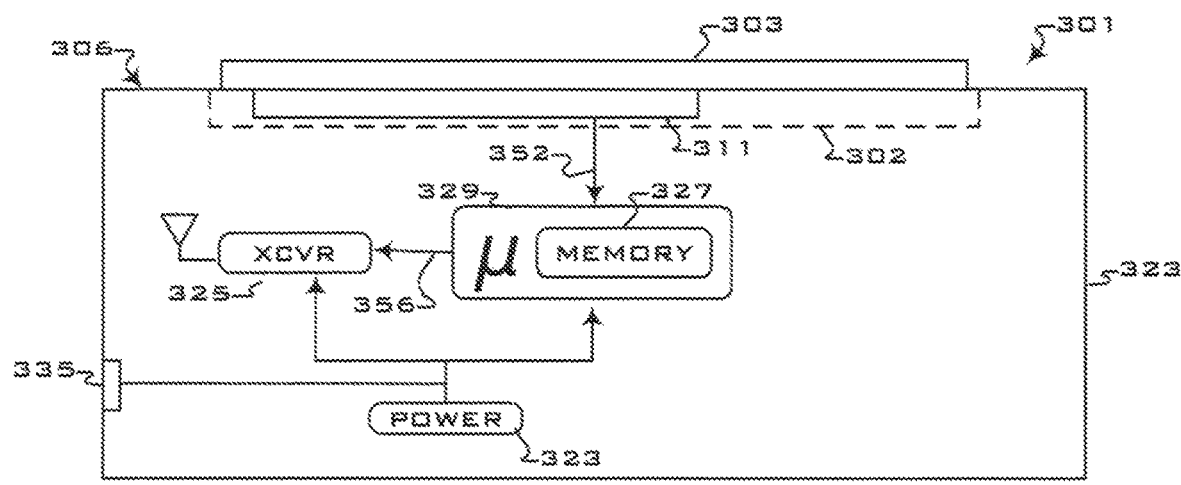
FIG. 3 is a functional diagram of an exemplary slave scale.

An exemplary slave scale 301 configured to be responsive to the master scale 101 is depicted in FIG. 3. Similar to the master scale 101, slave scale 301 includes a housing 323, likewise formed from a piece of solid material, preferably a metal or metal alloy, which supports a heavy load cell 311 that is disposed within a recess 302 defined in the top surface 306 of the housing 323. A load plate 303 is attached to the load cell 311 in the manner described above with respect to the master scale 101. The slave scale 301 also includes a computer-based microcontroller 329 enclosed within the housing 323 and which comprises a computer-readable memory 327. The slave scale 301 also comprises a power source 323 that is selectively engaged with switch 335 and which may be a 9 Volt battery, again, preferably rechargeable. A radio frequency transceiver 325 is responsive to the microcontroller 329. As with the heavy load cell 111 in the master scale 101, the load cell 311 is specified to accommodate loads up to about 1000 lbs. with a resolution as low as to about 1 lb.

Figure 4A:
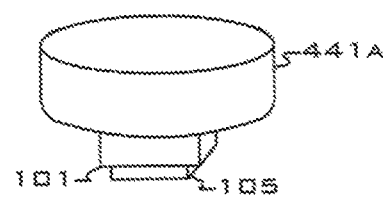
FIG. 4A shows a heavy load placed upon the master scale of FIGS. 1 & 2.

FIG. 4A presents the weighing of a heavy load 441a weighing between about 12 lbs up to about 1000 lbs. A single master scale 101 is placed on a suitable, level surface such that the light load cell 113 is oriented downward and the heavy load cell 111 is upward. The heavy load 441a is simply placed on top of the scale 101 and interacts with the heavy load cell 111. As described above, the cover 117 is placed over the light load cell 113 such that it is interposed between the light load cell 113 and the surface upon which the scale 101 is placed.

Figure 4B:
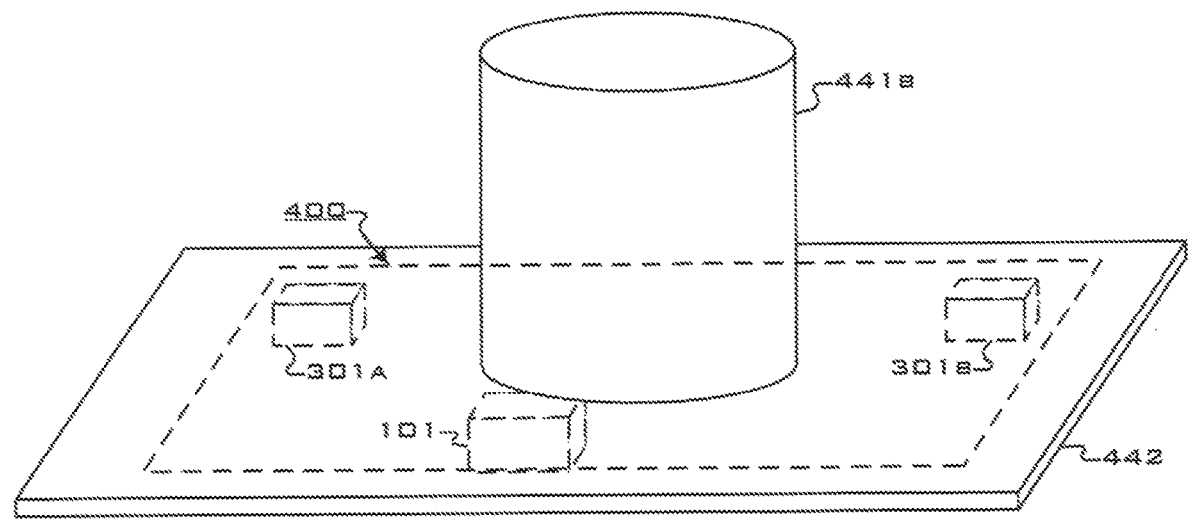
FIG. 4B depicts an example of a scenario in which a heavy load is weighed using an exemplary modular wireless scale system.

FIG. 4B depicts a scenario for weighing heavy loads that are greater than about 1000 lbs. The master scale 101 is placed with the heavy load cell 111 upward and at least two slave scales 301a, b are placed at some remote distance from the master scale 101 and from each other. For some cumbersome loads, a platform 441 may be placed across the scales 101, 301 and a load to be weighed 441 is placed on the platform. The master scale 101 alone may be used for loads less that about 12 lbs.

Figure 5:
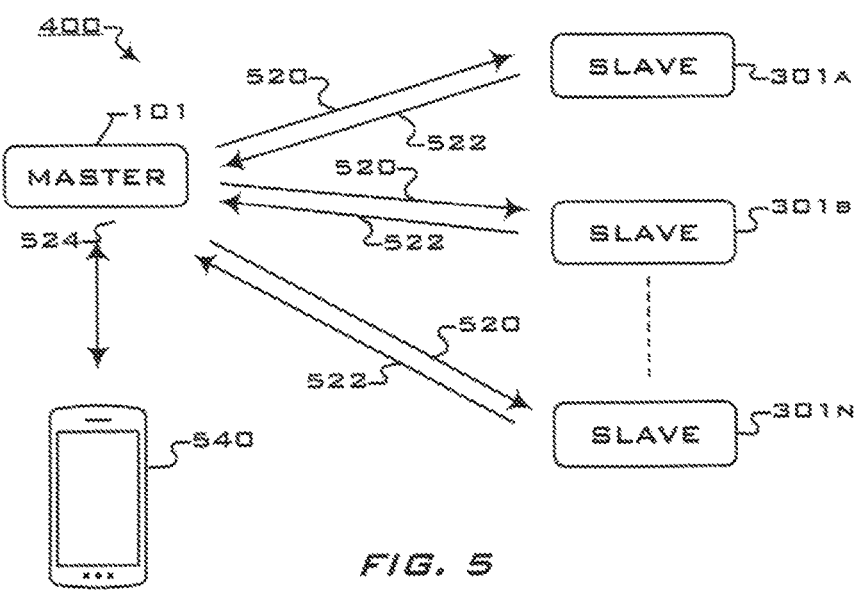
FIG. 5 illustrates the communications links among components of the modular wireless scale system.

The system 500 illustrated in FIG. 5 shows the weighing evolution for such loads 441. When master scale 101 and the plurality of slave scales 301a-n detect the load 441, the master scale 101 issues a wireless request signal 520 to each slave scale 301a-n which responds with a wireless signal 522 representative of the weight each scale has detected. The master scale 101 then calculates the total weight of the load 441 detected by the slave scales 301a-n as well as the force it has detected and renders the result on display 239 which may be configured to display weight in English or metric values. Advantageously, the system 500 preferably includes a handheld computer-based device 540, such as a smart phone or a tablet, in wireless communication with the master scale 101. Master scale 101 may issue a signal 524 to the handheld device 540 that represents the total weight. The handheld device 540, configured with a display 541 and the appropriate software, may then render a display of the value to an operator. Furthermore, the handheld device 540 may be configured with software that allows an operator to control the functions of the master scale 101 as will be described below.

Communications links between the master scale and the slave scales may be according to any of currently available protocols for wireless personal area networks (WPAN), for example, IEEE standard 802.15, or any suitable protocol hereafter developed. In one exemplary embodiment, the master and slave scales 101, 301 communicate using a "Shock Burst" protocol, developed by Nordic® Semiconductor. Likewise, communication between the master scale 101 and the handheld device 540 may be any suitable protocol for such applications, e.g., Bluetooth®.

Figure 6:
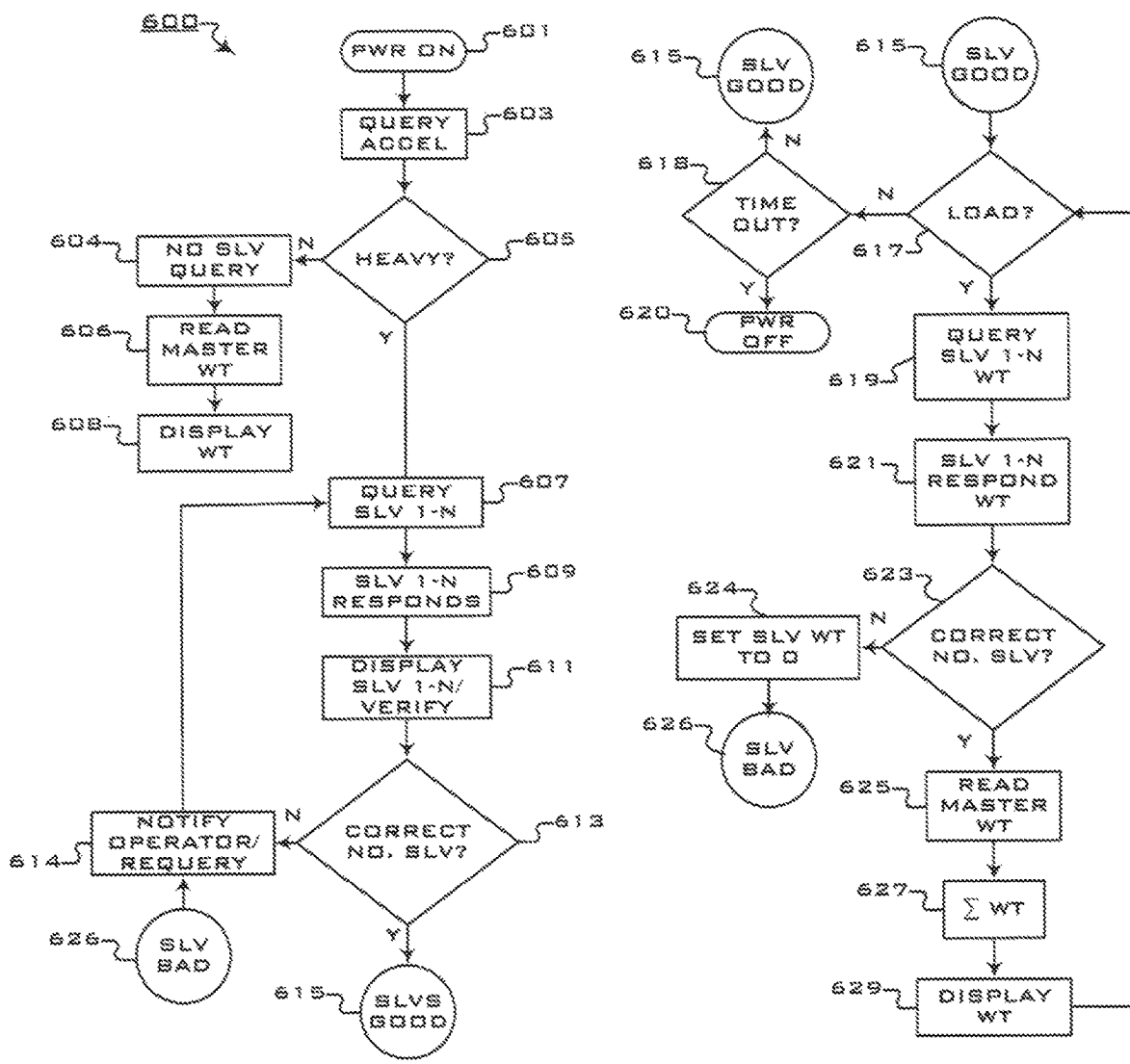
FIG. 6 is a flow diagram showing an exemplary process executed by the modular wireless scale system of FIG. 5.

FIG. 6 is a flow diagram of the process 600 executed by the system 400. The system is first powered on 601 by activation of the switch(es) 235, 335. The master scale microcontroller 229 queries the accelerometer 221 at step 603 and which provides a signal 250 to the microcontroller 229 representing the orientation of the master scale 101, either heavy load plate 103 up or light load plate 105 up. At decision point 605, if it is determined the light side is up, the master scale 101 does not query the slave scales 301a-n (Step 604) and when a light load (≤12 lbs) is placed on the master scale light load table 105, the master scale light load cell 113 issues a signal 254 to the microcontroller 229 which is configured to provide a signal 258 to cause the display 239 to provide the weight measurement value to the user 608. In the alternative or in conjunction with rendering the weight reading on the master scale display 239, the weight may also be displayed on the handheld device 540 upon a signal 524 from the master scale microcontroller 229 by issuing a signal 256 via the master scale transceiver 225 representing the weight which is received by the handheld device 540.

Alternatively, if at decision point 605 the master scale microcontroller 229 determines, based on the orientation signal 250 from the accelerometer 231, that the heavy load plate 103 is oriented upward, the master scale microcontroller 229 issues a wireless query signal 520 via transceiver 225 to each of the slave scales 301a-n 607 in an attempt to establish communication with the slave scales and set up a local network. At step 609 each slave scale 301a-n responds with a response signal 522 provided on command of the slave scale microcontroller 329 via the slave scale transceiver 325. When the slave scales respond indicating good communications, verification is displayed 611 on either or both the master scale display 239 and the handheld device 540. The master scale microcontroller 229 determines whether the proper plurality of slave scales 301a-n have responded 613. If not, the user is notified 614 with an alert on the display 239 or the handheld device 540 and the slave scales are re-queried 607. If the correct number of slave scales 301a-n respond and the communications network is established (through point 615) the master microcontroller 229 determines whether a heavy load 441 is detected by the heavy load cell 111 at step 617. If a load is not detected the master microcontroller 229, it assesses whether a pre-configured time-out threshold has been met 618. If the threshold has been met, the master microcontroller 229 emits a command to power off to the slave scales 301a-n which, when received by the slave microcontrollers 329, shut down 620. The master microcontroller 229 also commands the master scale power 223 to de-energize. If the time-out threshold has not been met, the system returns to step 615 and recursively evaluates whether there is a load (step 617) until a load is present or the time out threshold has been met. (Step 618).

If a load is detected at decision point 617, the master microcontroller 229 issues another query 520 to the slave scales 301a-n at step 619. Each slave scale 301a-n responds 621 with response signal 522, this time representing a value of the weight of the load detected by the slave scale. The master microcontroller 229 then determines whether the correct number of slave scales 301a-n have responded with their respective weight values at decision point 623. If not, at step 624, the non-responsive slave scale weight value is set to zero and at through point 626, the user is notified 614 and an attempt to re-establish communications ensues 607. If the correct number of slave scales have responded, the master microcontroller 229 reads the weight detected by the master scale the heavy load cell 111. This value is summed 627 with the values received from the slave scales 301a-n and the resulting composite weight value is display to the user 629. The system may display the data on the master scale display 239 or the data may be rendered on a display of the handheld device 540 as will be described below. The master microcontroller 229 then reassesses whether a load is detected 617 and the process is performed recursively until the load is no longer detected.

Figure 7:
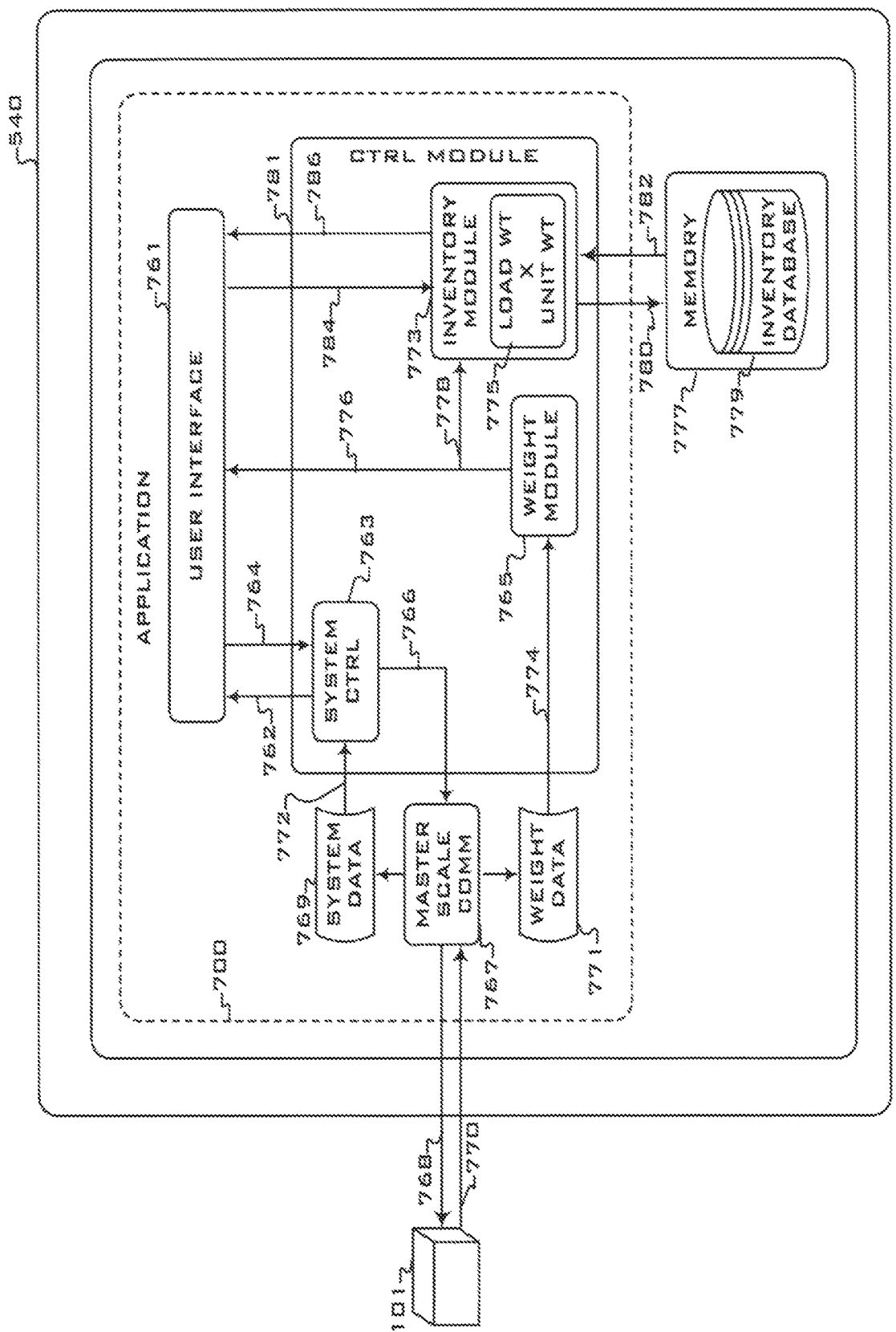
FIG. 7 is a functional diagram of an exemplary remote handheld device configured with an example control logic for wireless interaction with the master scale of FIGS. 1 & 2.

Given the total weight derived from the microscale system 400, inventory may be easily calculated by use of the handheld device 540 appropriately configured with a database populated with per unit weight of material. Referring now to FIG. 7, the handheld device 540 is depicted with a functional diagram of an exemplary application 700 with which the device 540 is programmed. In this example, application 700 comprises a user interface 761 that permits a user to access the functions of the application and to display relevant data to the user. A control module 781 executes the functions of the application 700 and may be comprised of a system control submodule 763 that provides command and control functions allowing a user to control the microscale system 400 using the handheld device 540. A weight submodule 765 functions to render weight data display to the user interface 761. An inventory submodule 773 allows the user to determine inventory amounts based upon the weight data obtained from the scale system 400. When the application is installed on the device 540, the device memory 777 is configured with an inventory database 779 that is populated with the materials a user is likely to weigh and the per unit weight corresponding to that material. The application 700 may further comprise a communication module 767 for providing communications interface between the application and the master scale 101 to allow the user to access the functions of the master scale 101 through the application 700.

In this example, a user may operate the application 700 by accessing the application through the user interface 761. The user interface 761, which is accessed by a user through an input/output device 810, first allows the user to initialize the system control module 763 which issues a command signal 766 to the communications module 767 that then relays a signal 768 to the master scale 101. The master scale begins to perform the process 600 described with reference to FIG. 6, steps 607 through 613 and issues a communication signal 770, which, at this point represents system status data 769 indicating whether the system is ready for use (Step 611) or whether the master scale has not received the correct number of responses from the slave scale 301. The system status data 769 is relayed to the system control module 763 with signal 772 and the system control module 763 issues a command signal to the user interface 761 to display the appropriate alert. If the system is shown to be bad at decision point 613, the display will so indicate (Step 614) the user may command the system 400 through the user interface 761 to requery the slave scales 301.

Alternatively, if the system 400 checks good (through point 615) and the master scale 101 initiates weighing functions when a load is detected at decision point 617. The signal from the master scale 768 is issued, this time representing weight data 771 which is relayed to the weight module 765 via signal 774. Weight module 765 then relays the weight data with a command signal 776 to the user interface 761 which is configured to display weight measured by the system 400.

The weight data 771 is also provided to the inventory module 773 via signal 778. The user may specify the type of material being weighed through the user interface 761 which provides that information to the inventory module 773 with signal 784. Upon receiving the material type information and weight data 771, the inventory module 773 is configured to issue a query signal 780 to the inventory database 779 stored in device memory 777, this signal representing data for the material type entered by the user. The database 779 is configured with a look-up table that provides the weight per unit for each type of material likely to be weighed by the user. The resulting signal from the database 782 returns the per unit weight value to the inventory module 773 which then executes a function 775 of multiplying the measured load weight by the per unit weight and the result as an inventory data signal 786 to the user interface 761 to be displayed to the user. This result may also be provided via wireless or wired communication signals to other computer-based systems (not shown).

As will be appreciated by those skilled in the relevant arts, the system may also be configured to populate the inventory database 779. In one embodiment, the handheld device 540 may be configured with control logic to allow a user to input through the user interface 761 a part description, e.g., a name, part number, or other identifying data, which can be saved in the inventory database 779 as a record. The master scale 101 may then be used to weigh the part, or parts, and control logic may execute a transfer of that weight data 771 to the inventory database 779. It should be noted that in the case of multiple parts, the number of parts should be input as well so that an average weight may be calculated and stored in the database.

As described above and shown in the associated drawings, the present system comprises a modular wireless scale system comprising microscales as well as methods performed thereby. While particular embodiments have been described, it will be understood, however, that any invention appertaining to the system and method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A system for weighing materials comprising:
    a master scale, said master scale comprising:
        a master scale housing;
        a computer-based master controller within said master scale housing;
        a heavy load cell supported on a first side of said master scale housing, said heavy load cell being capable of weighing heavy loads and configured to provide a signal representative of a heavy weight measurement to said master controller;
        a light load cell supported on an opposite side of said master scale housing with respect to said heavy load cell, said light load cell being capable of weighing light loads and configured to provide a signal representative of a light weight measurement to said controller; and
        a wireless transceiver within said master scale housing and responsive to said master controller; and
    two or more slave scales, each of said slave scales comprising:
        a slave scale housing;
        a computer-based slave controller within said slave scale housing;
        a heavy load cell supported by said slave scale housing and capable of weighting heavy loads and configured to provide a signal representative of a heavy weight measurement to said slave controller; and
        a wireless transceiver within said slave scale housing and responsive to said slave controller; and
    wherein said slave controller is responsive to said master controller through wireless communication.

2. The system of claim 1, wherein said heavy load cells are capable of supporting weight greater than about 12 lbs.

3. The system of claim 2, wherein said heavy load cells are capable of supporting weight no greater than about 1000 lbs.

4. The system of claim 1, wherein said master scale further comprises an accelerometer within said master scale housing, said accelerometer configured to provide a signal representing orientation of said heavy load cell and said light load cell in relation to vertical.

5. The system of claim 1, further comprising a cover for protecting said light load cell when said heavy load cell is in use.

6. The system of claim 5, wherein said master scale further comprises an accelerometer configured to provide a signal representing orientation of said heavy load cell with respect to vertical.

7. The system of claim 1, wherein said master scale further comprises user interface configured to allow a user to control functions of said master controller.

8. The system of claim 1, further comprising a remote computer configured to be in wireless communication with said master controller, said remote computer-based system configured with control logic for allowing a user to control functions of said master controller.

9. The system of claim 8, wherein said remote computer is configured with a database populated with weight-per-unit data corresponding to materials to be weighed.

10. The system of claim 9, wherein said remote computer is a hand-held device.

11. A method for weighing a load comprising the steps of:
    placing a master scale, said master scale comprising:
        a master scale housing;
        a computer-based first controller within said master scale housing;
        a heavy load cell supported on a first side of said master scale housing, said heavy load cell being capable of weighing heavy loads and configured to provide a signal representative of a heavy weight measurement to said first controller;
        a light load cell supported on an opposite side of said master scale housing with respect to said heavy load cell, said light load cell being capable of weighing light loads and configured to provide a signal representative of a light weight measurement to said controller; and
        a wireless master transceiver within said master scale housing and responsive to said first controller;
    determining an orientation of said first scale, said orientation being one of a heavy cell orientation and a light cell orientation; and
    placing said load upon said one of said heavy load cell and said light load cell.

12. The method of claim 11, further comprising:
    placing two or more slave scales, each of said two or more slave scales responsive to said master scale; each of said slave scales comprising:
        a slave scale housing
        a computer-based slave controller within said slave scale housing;
        a slave heavy load cell capable of weighing heavy loads and configured to provide a signal representative of a heavy weight measurement to said slave controller; and
        a wireless slave transceiver within said slave scale housing and responsive to said slave controller;
    generating a signal corresponding to a weight measurement of said load experienced by said master load cell; and
    wherein said load is placed upon said heavy load cell of said master scale and upon said heavy load cells of two or more slave scales.

13. The method of claim 12, further comprising the step of:
    displaying said weight measurement.

14. The method of claim 11, further comprising the steps of:
    generating a signal corresponding to a slave weight measurement of said load experienced by respective slave heavy load cells;
    transmitting, via said respective slave wireless transceivers, respective slave weight measurement signals generated by said slave heavy load cells;
    receiving said slave weight measurement signals by said master transceiver; and
    computing a combined weight measurement, said combined weight measurement representative of weight measurement of said master weight measurement and said slave weight measurements.

15. The method of claim 14, further comprising the step of:
    displaying said combined weight measurement.

16. The method of claim 14, further comprising the step of:
    transmitting, via said wireless master transceiver, a signal representative of said combine weight measurement to a remote computer device configured to be in wireless communication with said wireless master transceiver; and
    displaying said combined weight measurement via said remote computer device.

17. The method of claim 16, wherein said remote computer device is a computer-based handheld device.

18. A weighing system comprising:
    a first scale comprising:
        a housing;
        a computer-based control processor within said scale housing;
        a heavy load cell supported on a first side of said scale housing, said heavy load cell being capable of weighing heavy loads and configured to provide a signal representative of a heavy weight measurement to said control processor;
        a light load cell supported on an opposite side of said scale housing with respect to said heavy load cell, said light load cell being capable of weighing light loads and configured to provide a signal representative of a light weight measurement to said control processor; and
        a wireless transceiver within said scale housing and responsive to said control processor; and
    a remote computer-based device configured with control logic to allow a user to wirelessly communicate with said first scale via said wireless transceiver, said remote computer-based system configured with control logic for allowing a user to control functions of said first scale control processor.

19. The weighing system of claim 18, further comprising:
    one or more second scales responsive to said first scale, each said second scale comprising:
        a second housing;
        a computer-based control processor within said second housing;
        a heavy load cell supported by said second housing and capable of weighting heavy loads and configured to provide a signal representative of a heavy weight measurement to said control processor; and
        a wireless transceiver within said second housing and responsive to said control processor; and wherein said control processor is responsive to said master controller through wireless communication.

* * * * *